US012693626B2

(12) United States Patent
Van Dorpe

(10) Patent No.: US 12,693,626 B2
(45) Date of Patent: Jul. 28, 2026

(54) IMAGING SYSTEM AND A METHOD FOR IMAGING A SAMPLE

(71) Applicant: IMEC VZW, Leuven (BE)

(72) Inventor: Pol Van Dorpe, Spalbeek (BE)

(73) Assignee: IMEC VZW, Leuven (BE)

( * ) Notice: Subject to any disclaimer, the term of this patent is extended or adjusted under 35 U.S.C. 154(b) by 560 days.

(21) Appl. No.: 17/856,063

(22) Filed: Jul. 1, 2022

(65) Prior Publication Data

US 2023/0010628 A1     Jan. 12, 2023

(30) Foreign Application Priority Data

Jul. 6, 2021    (EP) ..................................... 21183899

(51) Int. Cl.
| | |
|---|---|
| *G03H 1/04* | (2006.01) |
| *G01N 21/47* | (2006.01) |
| *G03H 1/00* | (2006.01) |
| *G03H 1/08* | (2006.01) |
| *G03H 1/22* | (2006.01) |

(52) U.S. Cl.
CPC ........... *G03H 1/0443* (2013.01); *G01N 21/47* (2013.01); *G03H 1/0866* (2013.01); *G03H 1/22* (2013.01); *G03H 2001/005* (2013.01)

(58) Field of Classification Search
CPC ...... G03H 1/02; G03H 1/0443; G03H 1/0866; G03H 2001/005; G03H 2001/0447; G03H 2223/52
See application file for complete search history.

(56) References Cited

U.S. PATENT DOCUMENTS

| | | |
|---|---|---|
| 2005/0030545 A1 | 2/2005 | Tuschel et al. |
| 2012/0218379 A1* | 8/2012 | Ozcan ..................... G03H 1/06 |
| | | 348/40 |
| 2016/0061730 A1 | 3/2016 | Tagawa |
| 2022/0018649 A1* | 1/2022 | Furman ................ G01B 9/0209 |

(Continued)

FOREIGN PATENT DOCUMENTS

| | | | |
|---|---|---|---|
| CN | 111917964 | 11/2020 | |
| EP | 3339963 A1 * | 6/2018 | ........... G03H 1/0005 |
| EP | 3671176 A1 | 6/2020 | |

(Continued)

OTHER PUBLICATIONS

Trujillo et al., "Numerical dark field illumination applied to experimental digital lensless holographic microscopy for reconstructions with enhanced contrast", Optics Letters, vol. 43, No. 17, 2018, pp. 4096-4099.

(Continued)

*Primary Examiner* — Michael A Lyons
(74) *Attorney, Agent, or Firm* — MOSER TABOADA

(57)     ABSTRACT
According to an aspect of the present inventive concept there is provided an imaging system for imaging of a sample, comprising a light source, an interference filter and a detector, the light source generates illumination light of a single wavelength to induce elastic scattering of the light by the sample, the interference filter selectively reduces transmittance of light having an incident angle on the interference filter corresponding to non-scattered light, the detector is configured to detect a two-dimensional representation of the elastically scattered light transmitted by the interference filter.

18 Claims, 4 Drawing Sheets

(56)  References Cited

U.S. PATENT DOCUMENTS

2022/0196475 A1 *  6/2022  Vanmeerbeeck .... G03H 1/2645

FOREIGN PATENT DOCUMENTS

EP          3705875  A1      9/2020
WO      WO-2020011614  A1 *   1/2020

OTHER PUBLICATIONS

Verpillat et al., "Dark field digital holographic microscopy for 3D tracking of gold nanoparticles", Optical Society of America Optics Express, vol. 19, No. 27, 2011, pp. 26044-26055.
Dubois et al.: "Dark field digital holographic microscopy to investigate objects that are nanosized or smaller than the optical resolution", Optics Letters, vol. 33, No. 22, 2018, pp. 2605-2607.
Grishin et al., "Lens-free dark field digital holographic microscopy for 3D tracking of microparticles", Proceedings of SPIE 9448, Saratov Fall Meeting 2014: Optical Technologies in Biophysics and Medicine XVI, Laser Physics and Photonics XVI, and Computational Biophysics, 944816, 2015, pp. 944816-1-944816-8.
Extended European Search Report in European Patent Application No. 21183899.0 dated Dec. 17, 2021.

* cited by examiner

IMAGING SYSTEM AND A METHOD FOR IMAGING A SAMPLE

CROSS REFERENCE TO RELATED APPLICATION

This application claims priority to European Patent Application No. 21183899.0, filed on Jul. 6, 2021, incorporated herein by reference in its entirety.

TECHNICAL FIELD

The present inventive concept relates to an imaging system for imaging of a sample. The present inventive concept further relates to a method for imaging of a sample.

BACKGROUND

Digital holography, sometimes referred to as lens-free imaging has emerged as a cost effective, compact imaging method which can acquire images and quantitative data of samples at micrometer scale yet with a large field of view. For many digital holography imaging systems, no dyes or staining of the sample is necessary and low energy light is used. Thus, digital holography imaging may be a non-invasive imaging method.

Digital holography imaging uses scattering of light incident on a sample to acquire spatial information of the sample. Due to the advances within the field of detectors, patterns formed by light based on scattering of light, such as interference patterns between scattered and non-scattered reference light, may now be acquired and computer technology may be used for reconstructing an image of the sample based on a detected pattern.

In-line holographic microscopy is a powerful technique to image partially transparent samples, e.g. comprising cells in a matrix or dispensed in liquids. It is based on an interference pattern of scattered light with non-scattered light passing through the sample being formed and detection of this interference pattern on an image sensor. In-line holographic microscopy can reach a resolution that approximates resolution of standard microscopes, but for a much larger field of view. Further, in-line holographic microscopy allows 3D-reconstruction of an imaged sample.

In-line holographic microscopy works well for particles or structures with dimensions of at least 1 μm, where intensity of scattered light is still large enough to result in a measurable interference pattern. For smaller structures or particles, intensity of scattered light is strongly reduced, and an amplitude of interference fringes is too weak to allow imaging the structures or particles.

Having a large background signal, in comparison to a sample signal (the scattered light) reduces imaging quality and is a large drawback for digital holography imaging systems. Instead, invasive imaging methods are used to image small samples. The invasive methods may destroy rare samples and limit the possibilities to perform multiple analyses of the sample and long-time imaging, such as time-lapse imaging. The non-invasive methods provided by digital holography imaging may be used without damaging the sample, making it possible to study the sample using multiple analyses methods as well as for a longer time-span.

Thus, there is a need in the art for an imaging system for imaging small particles or structures, such as particles smaller than 1 μm.

SUMMARY

An objective of the present inventive concept is to provide an imaging system suitable for imaging of small particles or structures.

This and other objectives of the present inventive concept are at least partly met by the invention as defined in the independent claims. Preferred embodiments are set out in the dependent claims.

According to a first aspect, there is provided an imaging system for imaging of a sample, said imaging system comprising: a light source; an interference filter; and a detector; wherein the light source and the interference filter are configured to be arranged on opposite sides of the sample; wherein the light source is configured to generate illumination light of a single wavelength for illuminating the sample to induce elastic scattering of the light of the single wavelength by the sample; wherein the interference filter is configured to provide transmittance of the single wavelength in dependence of an angle of incident light, wherein the interference filter is configured to selectively reduce transmittance of light having an incident angle on the interference filter corresponding to non-scattered light, such that a relative intensity of the elastically scattered light of the single wavelength is increased by the interference filter in relation to non-scattered light of the single wavelength; wherein the detector is configured to detect a two-dimensional representation of the elastically scattered light of the single wavelength transmitted by the interference filter.

It is an insight of the present inventive concept that a light signal passing through a sample comprising small structures or particles, such as having dimensions smaller than 1 μm, is dominated by non-scattered light passing through the sample without interacting with the sample. It is a further insight that noise in such light signal may predominantly be due to shot noise of the non-scattered light.

Thanks to the imaging system of the first aspect, an interference filter is used which filters incident light in relation to the incident angle of light on the interference filter. Hence, the interference filter will selectively reduce intensity of light propagating in a direction corresponding to non-scattered light. This implies that the intensity of non-scattered light may be greatly reduced. Further, the interference filter transmits light that are incident in other angles, such that a relative intensity of light incident on the interference filter in angles differing to the incident angle of non-scattered light compared to intensity of non-scattered light is increased.

An effect of transmitting light in dependence of incident angle may be set for a specific wavelength. Thus, the interference filter may reduce transmittance of light for non-scattered light, while transmitting light of the same wavelength that is incident on the interference filter at a different angle. Elastic scattering of light by the sample (i.e. scattering that does not alter the wavelength of light) will direct light into all directions, such that elastically scattered light is not limited to a forward direction. This implies that the interference filter will transmit a larger proportion of scattered light than non-scattered light, such that a signal-to-noise ratio of the scattered light may be greatly improved. Hence, a weak signal of scattered light may be relatively stronger to background intensity, such that accurate detection of the scattered light is improved for improving imaging of the sample.

Using a set-up according to the first aspect, it is still possible to detect an interference pattern formed by interference of scattered light and non-scattered light to allow imaging of the sample based on a detected interference pattern. While the interference filter may reduce transmittance of light having an incident angle on the interference filter corresponding to non-scattered light, it need not necessarily completely block the non-scattered light. Thus, a portion of non-scattered light may be transmitted through the interference filter to allow the non-scattered light to interfere with the scattered light and form an interference pattern that may be detected for imaging of the sample.

The detector of the imaging system may thus detect a large proportion of scattered light in relation to non-scattered light, reducing background noise of the imaging system and thereby increasing image quality and the possibility to image small particles or structures.

However, it should be realized that, even though the imaging system of the first aspect is particularly useful for imaging small particles or structures, the imaging system may be used for imaging a sample comprising relatively large particles or structures, such as particles or structures with dimensions larger than 1 μm.

Further, it should be realized that the imaging system may be used for detecting the presence of a particle without necessarily reconstructing an image from the detected two-dimensional representation of the elastically scattered light. Thus, presence, and optionally location, of a particle may be determined using the imaging system.

The imaging system may be a digital holography imaging system. The imaging system may be a quantitative imaging system. Thus, the imaging system may give a quantitative image of the sample. The imaging system may be a compact imaging system, requiring no bulky optical component such as lenses or mirrors. The imaging system may thus be referred to as a lens-free imaging system, even though it should be realized that lenses could be used in the imaging system, e.g. for defining a light beam from the light source towards the sample.

The imaging system enables for an interference filter to be used for selectively transmitting light towards the detector in dependence of angle of incidence light on the interference filter. Thus, the interference filter may be an angular sensitive filter. The interference filter may be a band-stop filter, such as a band-rejection filter or a notch filter. Thus, the interference filter may be configured to pass elastically scattered light, while suppressing non-scattered light. This implies that light elastically scattered from the sample is selectively passed towards the detector, while the non-scattered light is selectively suppressed. Thus, the proportion of the scattered light reaching the detector is increased.

The interference filter may be a multilayer interference filter. An effect of the interference filter may be described as an interference between rays of light being reflected different number of times in interfaces defined by the interference filter between materials of different refractive indices. The interference filter may in this way select wavelengths and angles of incident light to be transmitted and blocked, respectively. Characteristics of the interference filter for selecting wavelengths and angles may be designed e.g. based on material(s) (and hence refractive index) used in layer(s) of the interference filter, thickness of layer(s), and number of layers.

The light source is configured to generate illumination light of a single wavelength, such as a monochromatic light. The single wavelength may be within and/or beyond the visible light spectrum, such as ultraviolet light, visible light, near-infrared light or infrared light.

It should be realized that light having an infinitesimal wavelength bandwidth may not be produced. Therefore, light of a single wavelength should be construed as light defining a narrow wavelength band. Thus, light of a single wavelength may have a wavelength bandwidth at full width half maximum (FWHM) smaller than 50 nm, such as smaller than 20 nm or smaller than 10 nm.

Further, it should be realized that a light emitting device of the light source need not necessarily output light of a single wavelength. Rather, the light source may comprise a light emitting device in combination with a filter for selecting a single wavelength from a plurality of wavelengths or broadband light such that the light source generates illumination light of a single wavelength.

In addition, it should be realized that the light source being configured to generate illumination light of a single wavelength should not be construed as the light source necessarily outputting light only of the single wavelength. Rather, the light source could also emit light of a separate, additional wavelength, wherein such light is not used for imaging the sample. In fact, the light source could even be configured to generate illumination light of two separate wavelengths, each forming a single wavelength, for illuminating the sample to induce elastic scattering of the light by the sample. Thus, the sample may sequentially or simultaneously be illuminated by the two separate wavelengths. The interference filter may then be configured to provide transmittance of each of the single wavelengths in dependence of an angle of incident light, such that the interference filter selectively reduces transmittance of non-scattered light for each of the single wavelengths. This could be achieved by stacking two interference filters, wherein each interference filter provides a selective transmittance based on angle of incidence for one of the two separate wavelengths and passes the other of the two separate wavelengths largely unaffected.

The light source may e.g. be a laser or a light emitting diode.

The light of a single wavelength is illuminating the sample to induce elastic scattering of the light so as to form elastically scattered light of the single wavelength. Thus, the elastically scattered light has the same single wavelength as the illuminating light.

The interference filter and/or the light source may be specifically adapted to each other's characteristics such that a desired transmittance of light in dependence of incident angle is provided for the single wavelength used. For instance, the interference filter may be specifically adapted to the single wavelength used for illuminating the sample.

The sample may be a biological sample, such as for instance a cell sample, a virus sample or any other sample with small particles. The sample may be a cell sample where the cells are very thin, or where the refractive index of the cells are close to the refractive index of the surrounding medium, wherein an intensity of elastically scattered light is weak.

The interference filter may be arranged on the detector by means of the interference filter being integral, e.g. monolithically integrated, with a substrate on which the detector is formed. However, the interference filter and the detector may be separately manufactured, and the interference filter may be attached or connected to the detector after manufacture of the separate components. According to yet another alternative, the interference filter is arranged in the optical path between the sample and the detector, wherein the interference filter is separate from the detector.

The detector may be a photo-sensitive detector. A photo-sensitive detector may be a sensor element for detecting photons, e.g. a photodetector. A photo-sensitive detector may be arranged to convert light photons into a current, a voltage or a charge. The detector may be a charge-coupled device (CCD) or a complementary metal-oxide-semiconductor (CMOS) image detector.

The detector is configured to detect a two-dimensional representation of the elastically scattered light of the single wavelength transmitted by the interference filter. Hence, the detector may comprise a two-dimensional array of photosensitive elements.

The detector may detect the presence of a particle, by using the elastically scattered light of the single wavelength transmitted by the interference filter.

According to one embodiment, the interference filter is configured to block transmittance of non-scattered light of the single wavelength such that the detector detects a point spread function from the elastically scattered light of the single wavelength transmitted by the interference filter.

It should be realized that by the interference filter being configured to block transmittance of non-scattered light, it is meant that the transmittance of non-scattered light is selectively reduced to such a proportion that the transmitted light is detected as a point-spread function by the detector. Thus, is it understood that not all photons of the non-scattered light are necessarily blocked, but it may block over 99% of the photons such as over 99.5% of the photons or 99.8% of the photons.

The point spread function may be formed by the selectively transmitted scattered light and detected by the detector. Thus, the detector detects light originating from point(s) in the sample according to the point spread function such that the detected point spread function may be used to reconstruct at least a two-dimensional representation of the sample.

According to another embodiment, the interference filter is configured to transmit a portion of the non-scattered light of the single wavelength, such that the scattered light and the non-scattered light form an interference pattern on the detector.

By allowing transmittance of a portion of the non-scattered light, the scattered light and the non-scattered light form an interference pattern of the detector. This interference pattern can be used for reconstructing a three-dimensional representation of the sample may be created. In particular, by allowing a portion of the non-scattered light to be transmitted, an interference pattern based on a phase difference between the scattered and the non-scattered light is formed. The phase difference between the scattered light and non-scattered light arises when the light has different pathlengths to travel depending on if is scattered by the sample or not. The phase difference information in the interference pattern may be used for reconstructing the three-dimensional representation of the sample.

According to an embodiment, the portion of non-scattered light being transmitted is not more than 10%, such as not more than 5%, such as not more than 1%.

The transmittance of non-scattered light may be measured in optical density (OD). Optical density is a logarithmic measurement of the percent of transmission. The interference filter may, for the non-scattered light, have an optical density of not less than 1 OD, such as not less than 2 OD.

By transmitting a small portion of non-scattered light, an intensity of the non-scattered light is reduced to a high degree by the interference filter. This implies that a relative intensity of the elastically scattered light to the non-scattered light is obtained that enables detecting the interference pattern with a good signal-to-noise ratio allowing an image of high image quality to be reconstructed.

According to an embodiment, the non-scattered light has an angle of incidence that is parallel to a normal of the interference filter.

This is a suitable arrangement of the interference filter in relation to the light source and may facilitate a simple design of the interference filter for providing a desired transmittance of the single wavelength in dependence of an angle of incident light. Further, simple mounting of the interference filter in the imaging system may be facilitated.

With this arrangement, the interference filter may be mounted such that rays of non-scattered light travel undisturbed from the opposite side of the sample to the interference filter and are incident perpendicularly on the interference filter. It should be realized that angle of incidence, measured between the normal of a surface of the interference filter and an incident light ray need not be exactly 0°, but it may be close to 0°, such as smaller than 0.5° or smaller than 0.2°. Further, it should be realized that, in other embodiments, the non-scattered light may have another angle of incidence on the interference filter, such as an angle of incidence of 30°.

According to another embodiment, the interference filter is configured to selectively reduce transmittance of light having an incident angle within an angular range of less than 10°, such as less than 5°. As an example, the transmittance of light rays having an incidence angle of 10°, 8°, 6°, 3° or less is selectively reduced.

This implies that transmittance of light is selectively reduced in a narrow angular range corresponding to the incident angle of non-scattered light. Hence, scattered light which is incident on the interference filter with an incident angle outside the angular range will be transmitted. Scattered light which is scattered mainly in a forward direction may fall within the angular range in which transmittance of light is selectively reduced. Thus, a portion of the scattered light may also be suppressed by the interference filter and not passed to the detector. Hence, by having a narrow angular range, a reduction of transmittance of the scattered light is limited, such that the detector of the imaging system may detect a large proportion of scattered light in relation to non-scattered light.

According to another embodiment, the interference filter is a notch filter. In other words, the interference filter may be a band-stop filter.

It is an insight of the present inventive concept that the interference filter may be designed so as to provide a notch or band-stop filter in relation to an angle of incidence of light on the interference filter. Thus, the interference filter may be used to selectively transmit light having an incidence angle different to a selected angular range.

A notch or band-stop filter is a filter that transmits most of the incident light but suppresses (e.g. reflects) light within an interval of the filter. In other words, the interval of the notch filer may suppress transmittance of light (non-scattered light) having an angle of incidence corresponding to a chosen interval, whereas light (scattered light) having an angle of incidence outside the chosen interval will be transmitted.

According to an embodiment, the imaging system further comprises a sample holder for receiving a sample, wherein the sample holder is configured to place a received sample between the light source and the interference filter.

The sample holder may thus be configured to provide a well-defined arrangement of the sample in relation to the light source and the interference filter, such that scattered light and non-scattered light will be incident on the interference filter with a desired angle.

It is realized that the sample may in itself also be provided in a "sample container", such as a cavity in which the sample is received. Thus, the sample holder may be configured to receive a "sample container" in which the sample may be provided.

The sample holder may be a fixed sample holder or a moveable sample holder, such that the imaging system may be configured to analyze a single sample in one imaging position or the imaging system may be configured to enable analysis in several imaging positions in one or a plurality of "sample containers". Moreover, the sample holder may have an inset which may allow for changing the dimensions of the sample holder such that "sample containers" with different dimensions may be used. This provides with a flexible set-up, allowing a user to choose the "sample container" best suitable for the assay.

According to an embodiment the light source is configured to generate polarized illumination light.

Polarized light scattered from the sample will have a rotated polarization in relation to the polarized illumination light. Thus, when the light source generates polarized illumination light, scattered light may have a different polarization compared to the non-scattered light which would keep the polarization of the illumination light. The interference filter may further be a polarization filter providing transmittance in dependence on polarization. Thus, by using polarized light, transmittance of the non-scattered light may further be reduced in relation to transmittance of scattered light based on a difference in polarization of the light.

According to an embodiment, the imaging system further comprises a processing unit configured to receive the two-dimensional representation of the elastically scattered light from the detector and configured to reconstruct a three-dimensional image of the sample based on the received two-dimensional representation.

Thus, the imaging system may be configured to generate a quantitative image based on detected light by the detector. The quantitative image may provide information about the sample, such as morphological data of the sample. It is an advantage of the present inventive concept to enable three-dimensional morphological data of the sample to be acquired without any stain or any other invasive compounds.

The processing unit may be remotely arranged from light detecting components (such as light source, interference filter, and detector) of the imaging system. Thus, the imaging system may comprise a communication unit, e.g. for wired or wireless communication, for communicating information from the detector to the processing unit. The processing unit may be provided on a computing unit connected to a network, such that the communication may take place via the network.

According to an embodiment, the imaging system is configured to image particles in the sample having a size smaller than 1 μm.

Due to the small size of the particles, a large proportion of the illumination light may pass the particles without being scattered. Thus, in conventional digital holography the interference pattern between the scattered and non-scattered light is weak and the interference fringes are difficult to separate from noise. Thus, image reconstruction of such small particles is hard to achieve. The present imaging system is adapted to reduce the transmittance of the non-scattered light through the interference filter, thereby increasing the proportion of scattered light transmitted through the interference filter compared to non-scattered light. This provides the present imaging system with an advantage compared to other systems, in that the sample may, exclusively or in combination with other structures, comprise small size particles which may be imaged.

The size of a particle may be defined as the diameter of a substantially circular particle, or it may be defined as a longest distance of a cross section of the particle.

The small size particles may comprise cells, viruses, bacteria or cell components such as mitochondria or exosomes.

According to an embodiment, the light source may be configured to generate illumination light of a first single wavelength and a second single wavelength, wherein the imaging system is configured to operate in a first and a second mode of operation, wherein: in the first mode of operation, the light source is configured to generate illumination light of the first single wavelength, and wherein the interference filter is configured to provide transmittance of the first single wavelength in dependence of an angle of incident light, wherein the interference filter is configured to selectively reduce transmittance of light having an incident angle on the interference filter corresponding to non-scattered light of the first single wavelength, such that a relative intensity of the elastically scattered light of the single wavelength is increased by the interference filter in relation to non-scattered light of the single wavelength; in the second mode of operation, the light source is configured to generate illumination light of the second single wavelength, and wherein the interference filter is configured to provide transmittance of the elastically scattered light and the non-scattered light of the second single wavelength.

The first mode of operation is suitable for imaging small particles in the sample, such as particles having a size smaller than 1 μm. The second mode of operation is suitable for imaging larger size structures of the sample. Thus, by not reducing transmittance of the non-scattered light in the second mode of operation the interference filter may transmit both scattered and non-scattered light to the detector. Larger size structures provide a larger amount of scattering and thus, the interference pattern formed between the scattered light and the non-scattered light is stronger for large size structures or particles compared to particles or structures having a small size. Hence, in the second mode of operation, there may be no need to reduce transmittance of the non-scattered light, and if such reduction of transmittance were applied the interference pattern may even be weakened.

The first mode of operation may be used in parallel to the second mode of operation to combine the resulted image into a combined image of small and large size particles. The first mode of operation may be used separately from the second mode of operation and vice versa.

It should be realized that the light source need not necessarily be limited to emit only a single wavelength. The light source may be configured to generate several distinguished wavelengths, such as several narrow bands of wavelengths distinguishable from each other. The light source may comprise several separate light-generating elements (such as several lasers or light emitting diodes), each generating a distinguished wavelength.

According to a second aspect, there is provided a method for imaging of a sample, said method comprising the steps of: generating light of a single wavelength; illuminating a sample with the light of the single wavelength to induce elastic scattering of the light of the single wavelength; selectively reduce transmittance of light having an incident angle on an interference filter corresponding to non-scattered light by the interference filter being configured to provide transmittance of the single wavelength in dependence of an angle of incident light, whereby a relative intensity of the elastically scattered light of the single wavelength is increased by the interference filter in relation to the non-scattered light of the single wavelength; detecting a two-dimensional representation of the elastically scattered light of the single wavelength transmitted by the interference filter.

This aspect may generally present the same or corresponding advantages as the former aspect. Embodiments mentioned in relation to the first aspect are largely compatible with the second aspect.

The method of the second aspect is advantageous in that is allows for imaging of small particles in a sample. Thus, the method of the second aspect allows for imaging of particles which do not cause a strong scattering of illumination light.

According to an embodiment of the second aspect, the method further comprises processing the two-dimensional representation of the elastically scattered light for reconstructing a three-dimensional image of the sample. The image may include morphological data about the sample, allowing it to be used for quantitative imaging analysis.

However, it should be realized that the two-dimensional representation of the elastically scattered light may be directly used, e.g. for detecting presence of a particle, without need of reconstructing a three-dimensional image of the sample.

Further, according to an embodiment of the second aspect, the sample comprises small particles having a size smaller than 1 μm and wherein the processing reconstructs a three-dimensional image of the small particles.

Thus, the method allows imaging of small size particles based on light being scattered by the small particles, even though intensity of scattered light based on such particles is relatively weak (compared to scattering by larger size particles).

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Detailed embodiments of the present invention will now be described with reference to the drawings.

10

Figure 1:
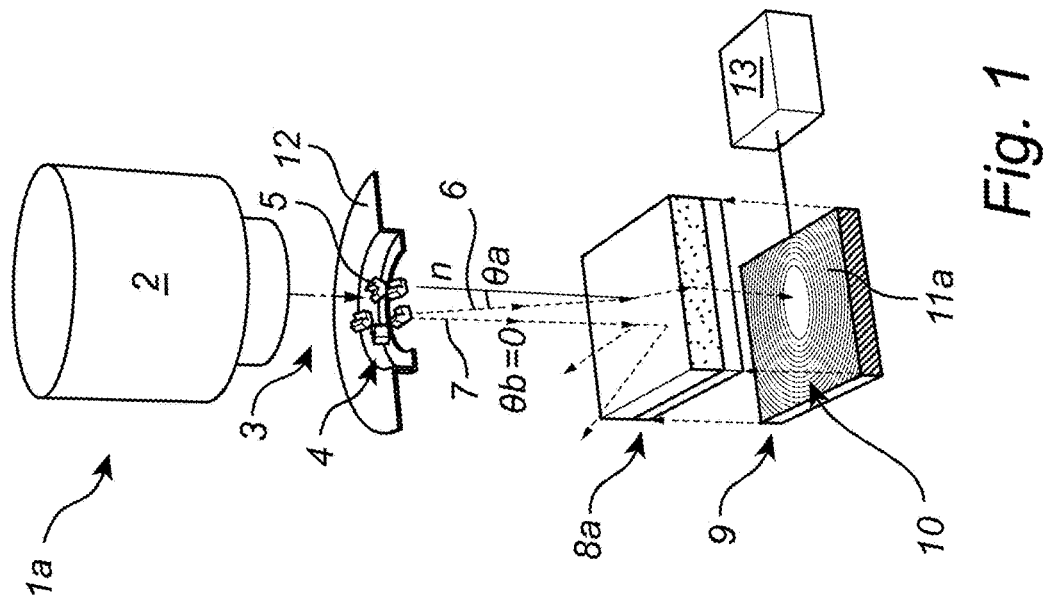
FIG. 1 is a schematic view of an imaging system according to a first embodiment.

FIG. 1 illustrates a schematic illustration of an imaging system 1a for imaging of a sample 4, according to an embodiment of the present disclosure.

The imaging system 1a comprises a light source 2 configured to generate illumination light 3 of a single wavelength. The single wavelength may be within and/or beyond the visible light spectrum, such as ultraviolet light, visible light, near-infrared light or infrared light. It should be realized that light having an infinitesimal wavelength bandwidth may not be produced, such that the light source 2 is configured to generate illumination light having a narrow wavelength band corresponding to the single wavelength.

The light source 2 may be a laser source for generating light of a single wavelength. The light source 2 may alternatively be a light emitting diode (LED) which may be configured, possibly in combination with a filter, to generate light of a single wavelength. Light generated by the LED may be passed through a pinhole so that the light from the light source 2 may be at least partially coherent.

The imaging system 1a is further configured to receive a sample 4. The sample 4 comprises small structures or particles 5, such as structures or particles 5 having dimensions smaller than 1 μm. In FIG. 1 it is illustrated as five structures or particles 5, however it should be realized that this is only to simplify the drawing and the number of particles may vary in the sample 4.

In the embodiment in FIG. 1, the sample 4 is received in a sample holder 12 of the imaging system 1a. The sample holder 12 is configured to place the sample 4 between the light source 2 and an interference filter 8a.

The illumination light 3 illuminates the sample 4. The illumination of the sample 4 induces elastic scattering of the light 3 of the single wavelength. However, when illuminating the small structures or particles 5 of the sample 4, only a portion of the illumination light 3 is interacting with the structures or particles 5 and thereby being scattered. The rest of the illumination light 3 passes through the sample 4 without interaction and thereby being non-scattered. Thus, after passing though the sample 4 the illumination light 3 is divided into scattered light 6 and non-scattered light 7, wherein the non-scattered light is the dominating portion.

Further, the imaging system 1 comprises the interference filter 8a. The interference filter 8a is configured to provide transmittance of the illumination light 3 in dependence of an angle of incident light θ. The angle of incident light is measured between the normal n to the surface of the interference filter 8a and the light rays from the scattered light 6 and the non-scattered light 7, respectively.

According to the set-up of the imaging system 1a in FIG. 1, the non-scattered light 7 has an angle of incidence θb close to 0°, thus the non-scattered light 7 is incoming perpendicular to the surface of the interference filter 8a.

It should be realized that the scattered light 6 may be scattered in all directions, including backward directions. The scattered light 6 may be predominantly scattered in forward directions. Part of the elastically scattered light 6 may have an angle of incidence similar to the angle of incidence of the non-scattered light. However, other parts of the elastically scattered light 6 is scattered in directions differing from the direction of the non-scattered light 7 such that parts of the scattered light 6 is incident on the interference filter 8a with an angle of incidence θa different from the angle of incidence θb of the non-scattered light 7.

When reaching the interference filter 8a, scattered light 6 is transmitted through the interference filter 8a while the non-scattered light 7 is reflected by the interference filter 8a. It should be realized that, as mentioned above, part of the scattered light 6 may have an angle of incidence similar to the non-scattered light 7, such that such part of the scattered light 6 will be reflected by the interference filter 8a. In the imaging system 1a illustrated in FIG. 1, the interference filter 8a is configured to block transmittance of light based on an angle of incidence of light of the single wavelength generated by the light source 3. Thus, the imaging system 1a may block basically all of the non-scattered light 7, although it should be realized that definitely blocking all of the non-scattered light 7 may not be possible. Meanwhile, the interference filter 8a is configured to transmit light of angles of incidence different to the angle of incidence of the non-scattered light 7. This implies that a relative intensity of the elastically scattered light of the single wavelength is increased by the interference filter 8a in relation to the non-scattered light.

Thus, the interference filter 8a will transmit a larger proportion of scattered light 6 than non-scattered light 7, such that a signal-to-noise ratio of the scattered light 6 transmitted by the interference filter 8a may be greatly improved. Hence, a weak signal of scattered light 6 may be relatively stronger to background intensity, such that accurate detection of the scattered light 6 is enabled for providing imaging of the sample 4 having particles 5 with small dimensions, such as dimensions smaller than 1 μm. In particular, since light may be predominantly passed unaffected through the sample 4, without the filtering by the interference filter 8a, the signal of scattered light 6 would otherwise be difficult to detect over shot noise of the non-scattered light 7.

It should be realized that the non-scattered light 7 need not necessarily have an angle of incidence of 0°. In such case, the interference filter 8a may be adapted such that transmittance is selectively reduced for light having the angle of incidence θb of the non-scattered light 7. For instance, the non-scattered light 7 may have an angle of incidence of 5° or 10°.

The interference filter 8a may be configured to reduce transmittance in an angular range around the angle of incidence of the non-scattered light 7. Thus, the interference filter 8a may for instance be configured to selectively reduce transmittance of light having an incident angle within an angular range of less than 10°, such as less than 5°. This implies that the scattered light 6 which is incident on the interference filter 8a with an angle of incidence outside the angular range for which transmittance is selectively reduced will be transmitted by the interference filter 8a.

The interference filter 8a may be formed by a plurality of layers having different refractive indices. For instance, layers of two different refractive indices may be alternatingly arranged in a stack of layers forming the interference filter 8a. Light will be at least partly reflected in interfaces between the layers. This implies that light will be reflected back and forth between interfaces on opposite sides of a layer and, hence, there may be interference between light having been reflected different number of times in the interfaces. The interference filter 8a may thus be arranged such that a destructive interference may occur in at least one interface formed by the plurality of layers for light being incident on the interference filter 8a with a particular angle for a single wavelength. This implies that the interference filter 8a may block or at least substantially reduce transmittance for light having an angle of incidence corresponding to non-scattered light for the single wavelength.

The interference filter 8a may form a notch filter, wherein the notch filter selectively blocks (or at least substantially reduces) transmittance of light of the single wavelength generated by the light source 2 for a selected range of angles of incidence on the interference filter 8a.

The imaging system 1a further comprises a detector 9. The detector 9 is configured to detect a two-dimensional representation 10 of the scattered light 6 transmitted by the interference filter 8a. As illustrated in FIG. 1, the detector 9 detects a point spread function 11a from the scattered light 6 transmitted by the interference filter 8a. In this case, even though the interference filter 8a does not necessarily block all of the non-scattered light 7, the interference filter 8a blocks non-scattered light 7 to such an extent that interference between scattered light 6 and non-scattered light 7 is not visible on the detector 9. Therefore, the detector 9 is able to detect the point spread function 11a. Light scattered from one particle 5 thus defines a point spread function 11a, which will be detected as light incident on the detector 9 around a central area corresponding to forward-scattered light being scattered into the same or almost the same direction as the non-scatted light 7.

The detector 9 may be integrated with the interference filter 8a such that the interference filter 8a is provided directly on top of the detector 9. This implies that light transmitted through the interference filter 8a will reach photo-sensitive elements of the detector 9 arranged directly below the interference filter 8a. However, the detector 9 need not necessarily be integrated with the interference filter 8a, but may preferably be arranged close to the interference filter 8a such that light passing through the interference filter 8a is efficiently collected and detected by the detector 9. In particular, the detector 9 is illustrated in the figures spaced apart from the interference filter 8a in order to allow for more clearly showing a light pattern formed on the detector 9.

The detector 9 may be formed as an array of photo-sensitive elements arranged in rows and columns. Each photo-sensitive element may be configured to detect photons, e.g. by converting photons into a current, a voltage or a charge. The detector 6 may for instance be a charge-coupled device (CCD) or a complementary metal-oxide-semiconductor (CMOS) image detector.

The detector 9 may comprise an analog-to-digital converter for converting the light detected by the photo-sensitive elements to a digital two-dimensional representation of the detected light.

The imaging system 1a in FIG. 1 further comprises a processing unit 13. The processing unit 13 is configured to receive the two-dimensional representation 10 of the scattered light 6 from the detector 9. The two-dimensional representation 10 comprises morphological information of the structures or particles 5 of the sample 4, from which the illumination light 3 was scattered. The processing unit 13 is further configured to reconstruct a three-dimensional image of the sample 4 based on the received two-dimensional representation. Thus, by using the information of the scattering the processing unit 13 may reconstruct the morphology of the structures or particles 5.

The processing unit 13 may be implemented as a general-purpose processing unit, such as a central processing unit (CPU), which may execute the instructions of one or more computer programs in order to perform the functions of the processing unit 13.

The processing unit 13 may alternatively be implemented as firmware arranged e.g. in an embedded system, or as a specifically designed processing unit, such as an Application-Specific Integrated Circuit (ASIC) or a Field-Programmable Gate Array (FPGA), which may be configured to perform the functions of the processing unit 13.

Figure 2B:
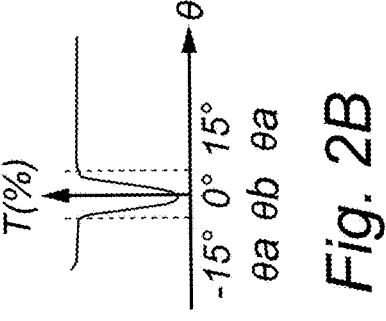
FIG. 2B is a schematic view of transmittance of the interference filter of the imaging system of the second embodiment.
Figure 2A:
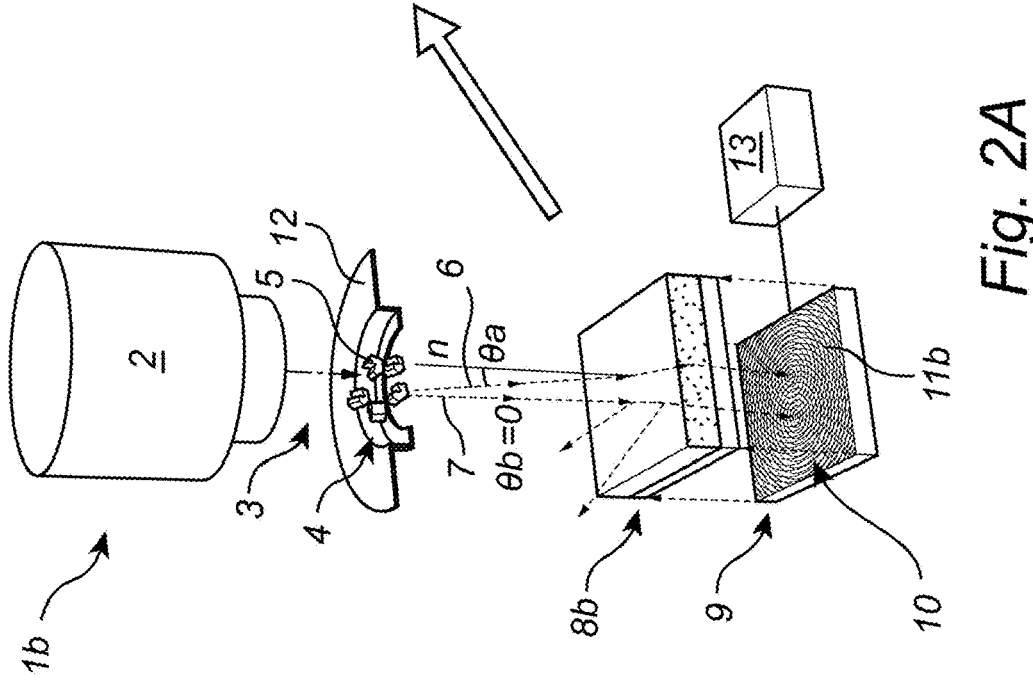
FIG. 2A is a schematic view of an imaging system according to a second embodiment.

FIG. 2A illustrates another embodiment of the imaging system 1b. The imaging system 1b in FIG. 2A comprises many of the features with the imaging system 1a in FIG. 1. The same features are indicated by the same reference signs in FIGS. 1-2A. For brevity, only the differences between the embodiments will be discussed below.

The imaging system 1b has an interference filter 8b, being configured to transmit a portion of the non-scattered light 7. The portion of non-scattered light 7 being transmitted is still small. For example, the portion of non-scattered light 7 being transmitted by the interference filter may be not more than 10%, not more than 5% or not more than 1% of the non-scattered light incident on the interference filter 8b.

The interference filter 8b may function in a similar manner as described above for the interference filter 8a using interference between light having been reflected different number of times in interfaces between the layers of the interference filter 8b in order to define transmittance by the interference filter 8b.

In this embodiment, the scattered light 6 and the non-scattered light 7 forms an interference pattern 11b on the detector 9. The processing unit 13 may then use information from both the scattered light 6 and the non-scattered light 7 to reconstruct a three-dimensional image of the sample 4.

The interference filter 8b of the imaging system 1b is a notch filter, thus a band stop filter. The transmittance T of the light is illustrated as a function of angle of incidence θ in FIG. 2B. The transmittance T through the interference filter is reduced for light being incident on the interference filter 8b with an angle of incidence close to 0°.

Figures 3A, 3B:
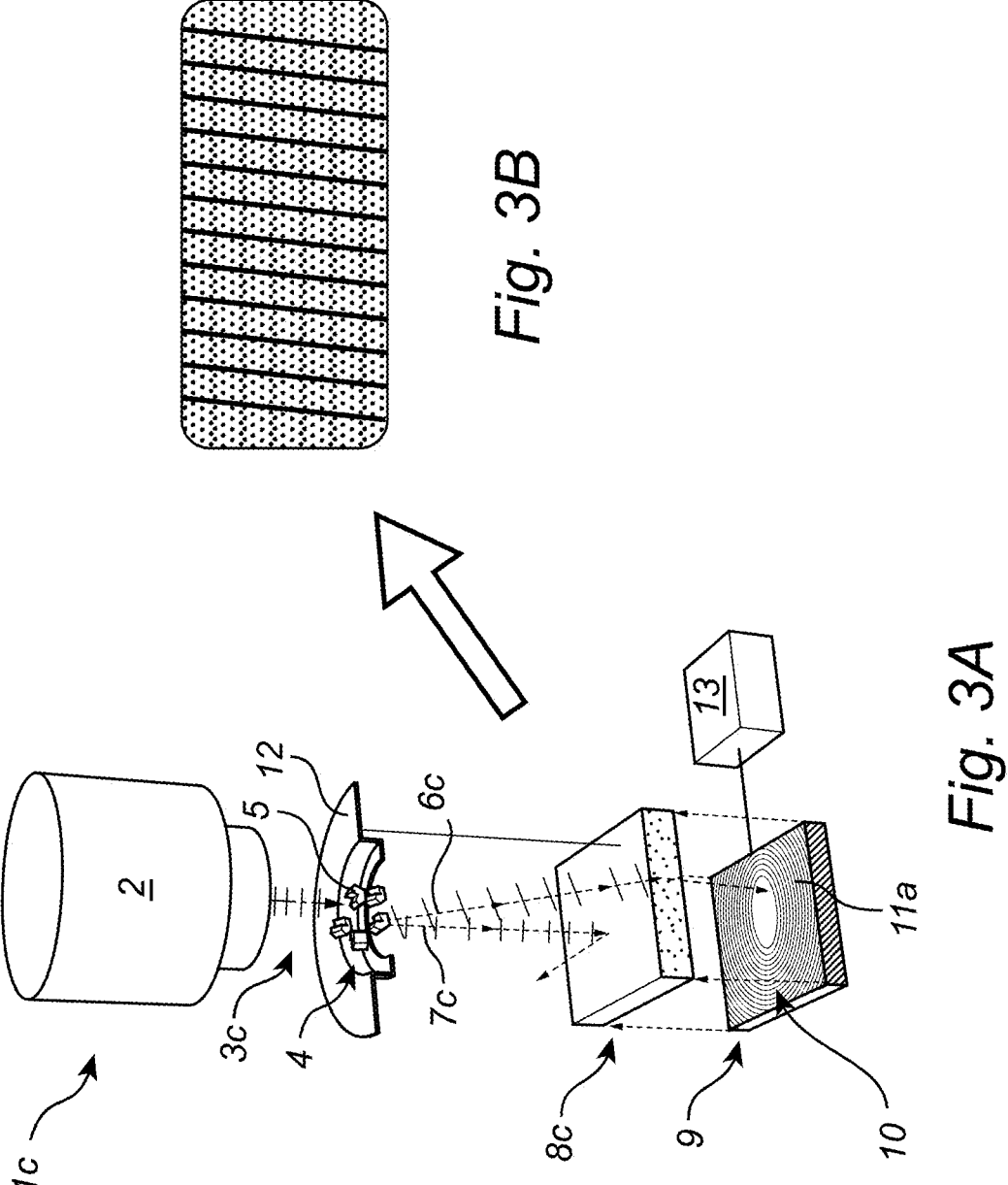
FIG. 3A is a schematic view of an imaging system according to a third embodiment.
FIG. 3B is a schematic view of the interference filter of the imaging system of the third embodiment.

FIG. 3A illustrates a further embodiment of the imaging system 1c. The imaging system 1c has a light source 2 generating polarized light 3c. When the polarized light illuminates the sample the non-scattered light 7c keeps the original polarization, while the scattered light 6c changes polarization. Thus, there is a difference in the polarization between the scattered light 6c and the non-scattered light 7c. As is illustrated in FIG. 3b, the interference filter 8c is a polarization filter, in addition to being configured to provide transmittance in dependence of an angle of incident light, such that the interference filter 8c further provides transmittance of light depending on polarization. Thus, by using polarized light 3c, transmittance of the non-scattered light 7c may further be reduced in relation to transmittance of scattered light 6c based on a difference in polarization of the light.

Figure 4B:
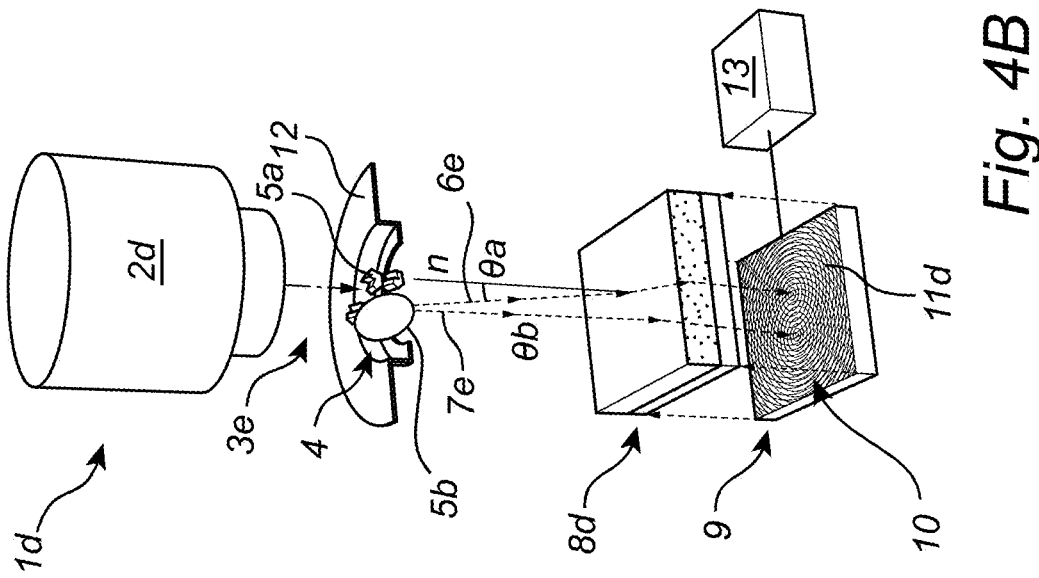
FIGS. 4A and 4B are schematic views of an imaging system according to a fourth embodiment in a first and second mode of operation, respectively.
Figure 4A:
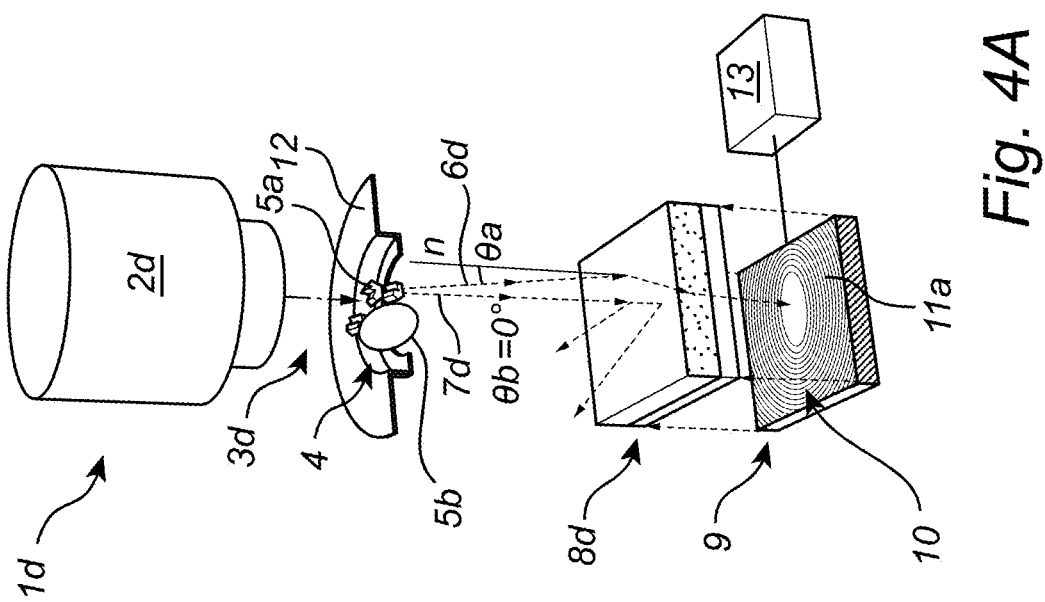

FIGS. 4A and 4B illustrates yet a further embodiment of the imaging system 1d. The imaging system 1d has two modes of operation, illustrated as a first mode of operation in FIG. 4A and a second mode of operation in FIG. 4B. The light source 2d of the imaging system 1d is configured to generate illumination light of a first single wavelength 3d and a second single wavelength 3e.

In the first mode of operation, the light source 2d illuminates the sample 4 with the first single wavelength 3d. The first mode of operation is similar to what is described in connection to FIG. 1 or similar to what is described in connection to FIG. 2. Thus, the interference filter 8d is in the first mode of operation configured to transmit light in dependence of angle of incident light so as to reduce transmittance of the non-scattered light 7d, while transmitting the scattered light 6d.

In the second mode of operation, illustrated in FIG. 4B, the light source 2d illuminates the sample 4 with a second single wavelength 3e. The interference filter 8d is in the second mode of operation configured to provide transmittance of the scattered light 6e and the non-scattered light 7e.

In the imaging system 1d as illustrated in FIGS. 4A and 4B, the sample 4 comprises small structures and particles 5a and larger structures 5b. In the first mode of operation, the detector 9 detects a point spread function 11a from the scattered light 6d or an interference pattern 11b formed by scattered light 6d and non-scattered light 7d, wherein the relative intensity of the scattered light 6d is increased by the interference filter 8d in relation to the non-scattered light 7d. The point spread function 11a or the interference pattern 11b is used to reconstruct a two-dimensional image of the small structures and particles 5a in the processing unit 13. In the second mode of operation, the detector 9 detects an interference pattern 11d from scattered light 6e and non-scattered light 7e, wherein the relative intensity of the scattered light 6e and non-scattered light 7e is not affected by the interference filter 8d (since the intensity of the scattered light 6e is not drowned in noise of the non-scattered light 7e). The interference pattern 11d is used to reconstruct a three-dimensional image of the larger structures 5b in the processing unit 13.

It should be realized that the two modes of operation may be used with the same sample 4 for imaging different structures within the same sample 4. However, the two modes of operation may be used with different samples, such that, depending on characteristics of the sample, the imaging system 1d may be set in the first mode of operation or in the second mode of operation. This implies that the imaging system 1d is versatile and may be used with different types of samples.

The processing unit 13 may further be used to control the mode of operation of the light source 2d. Thus, a user may provide input to the processing unit 13 for controlling a mode of operation of the imaging system 1d.

Figure 5:
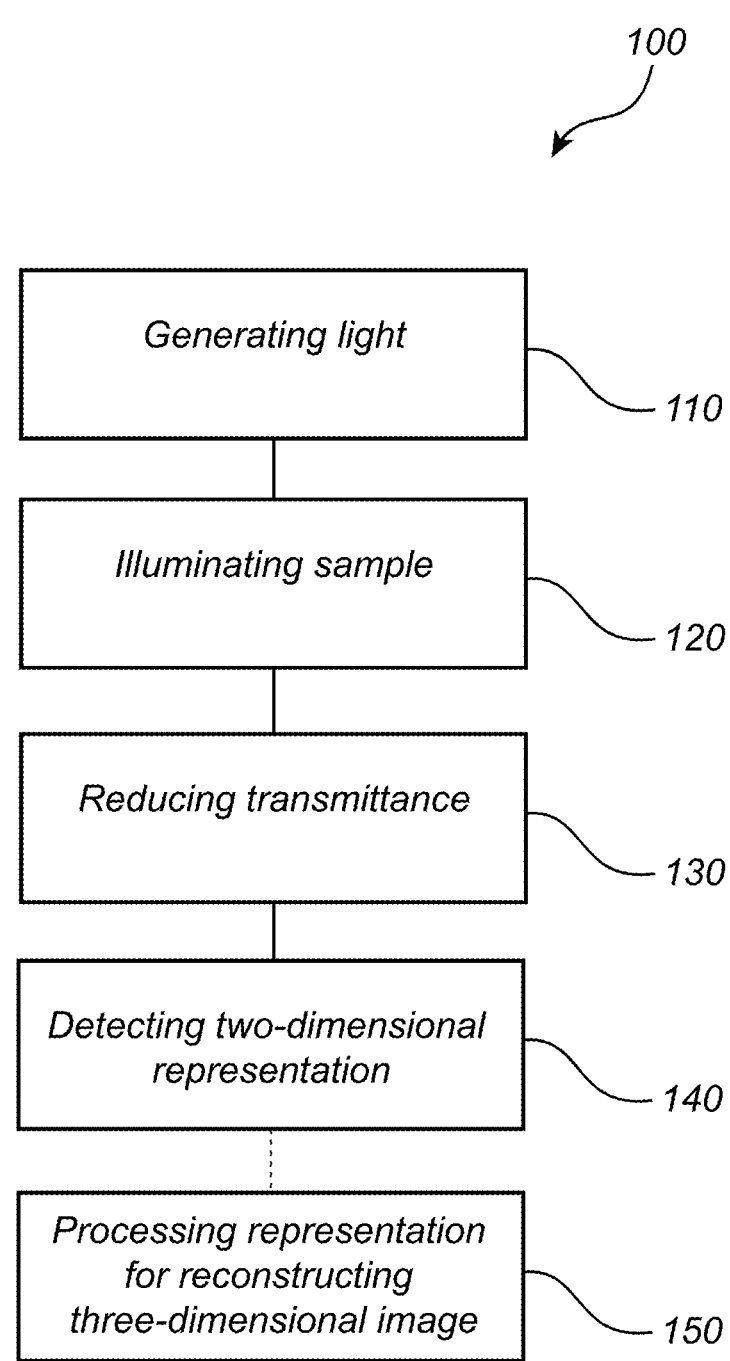
FIG. 5 is a flowchart of a method according to an embodiment.

FIG. 5 illustrates a method 100 for imaging of a sample. The method comprises the steps of generating light of a single wavelength 110, and illuminating a sample with the light of the single wavelength 120 to induce elastic scattering of the light of the single wavelength. The sample may comprises small particles having a size smaller than 1 μm, which implies that only a small portion of light will be scattered by the small particles. The method further comprises selectively reducing transmittance 130 of light having an incident angle on an interference filter corresponding to non-scattered light by the interference filter being configured to provide transmittance of the single wavelength in dependence of an angle of incident light, whereby a relative intensity of the elastically scattered light of the single wavelength is increased by the interference filter in relation to the non-scattered light of the single wavelength. The method further comprises detecting a two-dimensional representation 140 of the elastically scattered light of the single wavelength transmitted by the interference filter. The two-dimensional representation may be a point spread function formed by the elastically scattered light or an interference pattern formed by the scattered light interfering with a small portion of non-scattered light being transmitted by the interference filter.

Further, the method may comprise the step of processing the two-dimensional representation of the elastically scattered light for reconstructing a three-dimensional image 150 of the sample.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An imaging system for imaging of a sample, said imaging system comprising:
 a light source;
 an interference filter; and
 a detector;
 wherein the light source and the interference filter are configured to be arranged on opposite sides of the sample;
 wherein the light source is configured to generate illumination light of a single wavelength for illuminating the sample to induce elastic scattering of the light of the single wavelength by the sample;
 wherein the interference filter is configured to provide transmittance of the single wavelength in dependence of an angle of incident light, wherein the interference filter is configured to selectively reduce transmittance of light having an incident angle on the interference filter corresponding to non-scattered light such that a relative intensity of the elastically scattered light of the single wavelength is increased by the interference filter in relation to non-scattered light of the single wavelength;
 wherein the detector is configured to detect a two-dimensional representation of the elastically scattered light of the single wavelength transmitted by the interference filter.

2. The imaging system according to claim 1, wherein the interference filter is configured to block transmittance of non-scattered light of the single wavelength such that the detector detects a point spread function from the elastically scattered light of the single wavelength transmitted by the interference filter.

3. The imaging system according to claim 1, wherein the interference filter is configured to transmit a portion of the non-scattered light of the single wavelength, such that the scattered light and the non-scattered light form an interference pattern on the detector.

4. The imaging system according to claim 3, wherein the portion of non-scattered light being transmitted is not more than 10%.

5. The imaging system according to claim 3, wherein the portion of non-scattered light being transmitted is not more than 5%.

6. The imaging system according to claim 3, wherein the portion of non-scattered light being transmitted is not more than 1%.

7. The imaging system according to claim 1, wherein the non-scattered light has an angle of incidence parallel to a normal of the interference filter.

8. The imaging system according to claim 1, wherein the interference filter is configured to selectively reduce transmittance of light having an incident angle within an angular range of less than 10°.

9. The imaging system according to claim 8, wherein the interference filter is configured to selectively reduce transmittance of light having an incident angle within an angular range of less than 5°.

10. The imaging system according to claim 1, wherein the interference filter is a notch filter.

11. The imaging system according to claim 1, wherein the imaging system further comprises a sample holder for receiving the sample, wherein the sample holder is configured to place the received sample between the light source and the interference filter.

12. The imaging system according to claim 1, wherein the light source is configured to generate polarized illumination light.

13. The imaging system according to claim 1, further comprising a processing unit configured to receive the two-dimensional representation of the elastically scattered light from the detector and configured to reconstruct a three-dimensional image of the sample based on the received two-dimensional representation.

14. The imaging system according to claim 1, wherein the imaging system is configured to image particles in the sample having a size smaller than 1 μm.

15. The imaging system according to claim 1, wherein the light source is configured to generate illumination light of a first single wavelength and a second single wavelength, wherein the imaging system is configured to operate in a first and a second mode of operation, wherein:
 in the first mode of operation, the light source is configured to generate illumination light of the first single wavelength, and wherein the interference filter is configured to provide transmittance of the first single wavelength in dependence of an angle of incident light, wherein the interference filter is configured to selectively reduce transmittance of light having an incident angle on the interference filter corresponding to non-scattered light of the first single wavelength, such that a relative intensity of the elastically scattered light of the single wavelength is increased by the interference filter in relation to non-scattered light of the single wavelength;
 in the second mode of operation, the light source is configured to generate illumination light of the second single wavelength, and wherein the interference filter is configured to provide transmittance of the elastically scattered light and the non-scattered light of the second single wavelength.

16. A method for imaging of a sample, said method comprising the steps of:
 generating light of a single wavelength;
 illuminating the sample with the light of the single wavelength to induce elastic scattering of the light of the single wavelength;
 selectively reducing transmittance of light having an incident angle on an interference filter corresponding to non-scattered light by the interference filter being configured to provide transmittance of the single wavelength in dependence of an angle of incident light, whereby a relative intensity of the elastically scattered light of the single wavelength is increased by the interference filter in relation to the non-scattered light of the single wavelength;
 detecting a two-dimensional representation of the elastically scattered light of the single wavelength transmitted by the interference filter.

17. The method according to claim 16, further comprising processing the two-dimensional representation of the elastically scattered light for reconstructing a three-dimensional image of the sample.

18. The method according to claim 17, wherein the sample comprises small particles having a size smaller than 1 μm and wherein the processing reconstructs a three-dimensional image of the small particles.

* * * * *